United States Patent [19]

Krueger et al.

[11] 4,269,173
[45] May 26, 1981

[54] SYSTEM FOR MOUNTING SOLAR COLLECTOR PANELS

[75] Inventors: Wallace F. Krueger, Toledo; Anthony R. Shaw; Jerry L. Smith, both of Waterville, all of Ohio

[73] Assignee: Libbey-Owens-Ford Company, Toledo, Ohio

[21] Appl. No.: 900,494

[22] Filed: Apr. 27, 1978

[51] Int. Cl.³ .............................................. F24J 3/02
[52] U.S. Cl. .................................... 126/450; 126/417
[58] Field of Search ............... 126/270, 271, 450, 417, 126/432, 442; 211/182; 248/165

[56] References Cited

U.S. PATENT DOCUMENTS

| | | | |
|---|---|---|---|
| 514,669 | 2/1894 | Allingham | 126/270 |
| 670,916 | 3/1901 | Eneas | 126/271 |
| 2,405,877 | 8/1946 | Delano | 126/271 |
| 3,193,060 | 7/1965 | Park | 211/182 X |
| 3,523,613 | 8/1970 | Konstant | 211/182 X |
| 4,074,811 | 2/1978 | Filak | 211/182 X |
| 4,133,298 | 1/1979 | Hayama | 165/181 |

*Primary Examiner*—James C. Yeung
*Assistant Examiner*—Larry Jones
*Attorney, Agent, or Firm*—Collins, Oberlin & Darr

[57] ABSTRACT

A system including at least a pair of mounting spars supported in a spaced-apart parallel relationship by modular sections constructed of standardized hardware for mounting one or more solar collector panels in predetermined positions on stationary surfaces. The system includes provisions for accommodating expansion and contraction of the collector panels and insulating the manifold pipes employed in a solar installation for preventing radiation heat losses.

2 Claims, 9 Drawing Figures

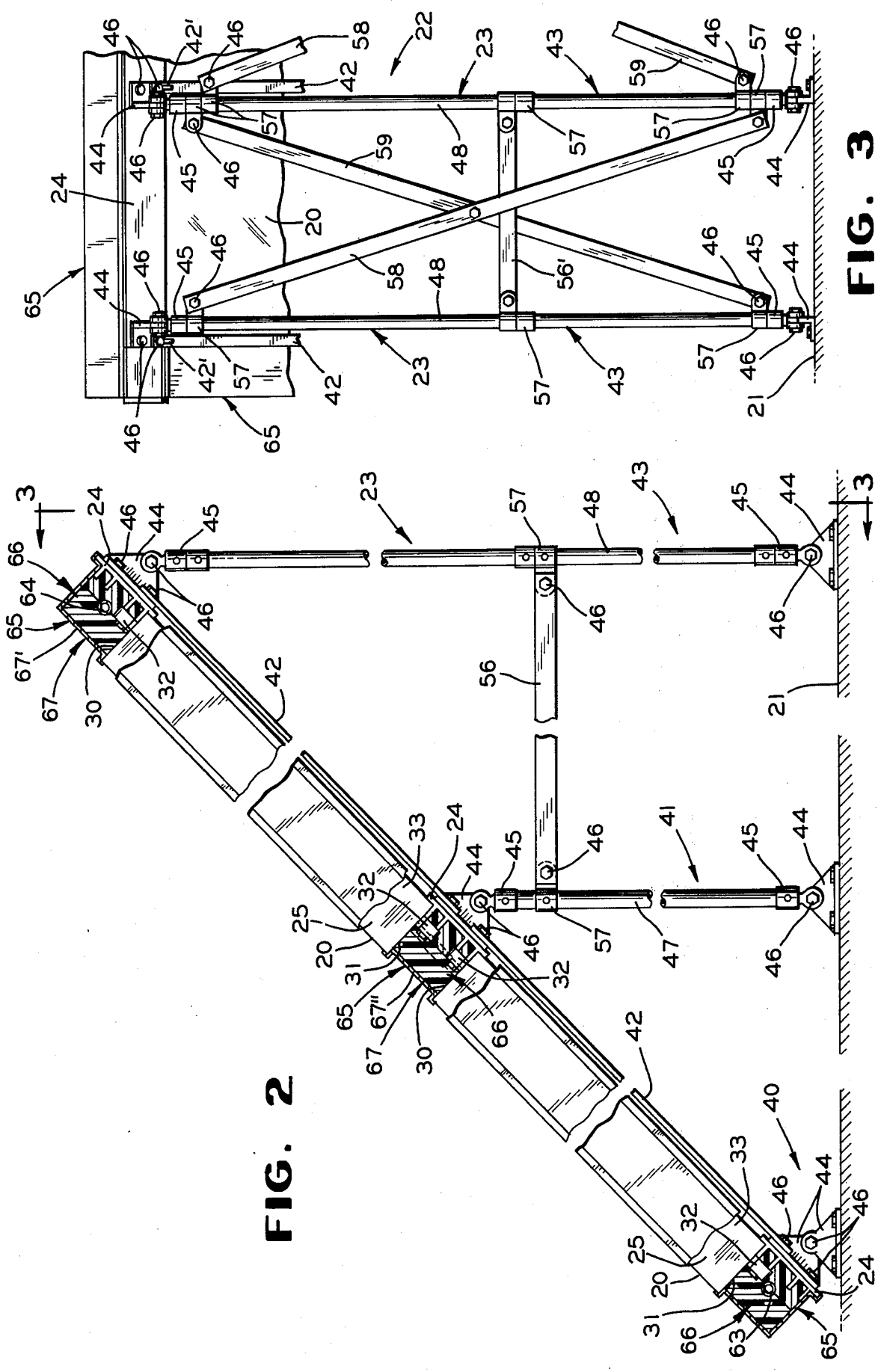

SYSTEM FOR MOUNTING SOLAR COLLECTOR PANELS

BACKGROUND OF THE INVENTION

1. Field of the Invention

This invention generally relates to apparatus for mounting panels in predetermined positions, and more particularly to apparatus for mounting one or more solar collector panels at a desired angle of inclination regardless of the slope of the supporting surface.

2. Description of the Prior Art

Briefly, solar collectors, and particularly flat plate collectors, are positioned to face the sun so as to receive maximum total solar radiation. Accordingly, they are inclined from a horizontal plane at an angle calculated to intercept the maximum amount of radiant energy from the sun at the latitude of their installation. Of course, the angle of inclination of the solar collectors will be predicated upon the latitude of their installation and will be independent of the slope at the surface on which the collectors are mounted.

Generally, solar collecting installations employing flat plate collectors, for which the present invention is particularly adapted although not limited thereto, include plurality of individual panels. Accordingly, it is highly desirable to have a versatile mounting system that is easily modified to support one or more flat collector panels at a desired angle of inclination regardless of the slope of the supporting surface. Heretofore, flat solar collector panels have been mounted on stands specifically designed for their particular installation. Also, in the past, such stands have not included means providing for the expansion and contraction of the collector panels relative thereto, nor have they included means for insulating the manifold pipes for preventing heat losses, while providing an esthetic appearance.

SUMMARY OF THE INVENTION

Generally speaking, the invention provides a novel mounting system composed of modular sections constructed of standardized components which are easily assembled in various arrangements for supporting one or more solar collector panels in predetermined inclined positions. The mounting system also includes means for permitting expansion and contraction of the solar panels relative thereto as well as supporting insulating blocks for insulating the manifold pipes employed in a solar collecting installation.

More particularly, the mounting system comprises at least a pair of mounting spars supported in a spaced-apart, horizontally extending parallel relationship and disposed in a predetermined position, by the modular sections. The modular sections may be simple support frames composed of common structural elements or complex triangular space frames composed of ball and strut elements. In one type of mounting system, each modular section generally comprises a front stand-off leg, a rear attitude positioning leg and a spreader bar connecting the top ends of the front and rear legs together. At least two of the modular sections are employed to support the pair of spaced apart, horizontally extending mounting spars on which the opposed edges of individual solar panels rest. Each mounting spar is provided with means, which together with means provided on the solar panels, provide for the expansion and contraction of the solar panels relative thereto, the expansion and contraction of the solar panels being due to changes in the ambient temperature.

As contemplated by the invention, each mounting spar is provided with at least two supporting portions, one for supporting the top edge of one solar panel and the other for supporting the bottom edge of an adjacent solar panel. The supported edges of each solar panel is secured to its respective mounting spar by means of hold down brackets provided on the opposed walls of the solar panel. The hold down brackets also serve as handles for ease in handling the solar panels, during installation and shipping.

Also, the mounting spars are designed to support insulating blocks and/or other wrapped insulation which encase the manifold pipes and which are covered by flashings secured to the mounting spars and/or the edges of the solar panels.

OBJECTS AND ADVANTAGES

An object of this invention is to provide a mounting system for mounting solar collector panels wherein the system is composed of modular sections constructed of standardized components and which can be assembled in various patterns so that one or a number of panels can be easily included in a collector array.

Another object of this invention is to provide a mounting system which accommodates expansion and contraction of the solar panels relative thereto.

Yet another object of this invention is to provide a mounting system which supports solar panels above supporting surfaces for the circulation of air therebeneath.

Still another object of this invention is to provide a mounting system that has the capability of achieving different mounting angles of the solar panels and which is adaptable to supporting slopes extending from horizontal to near vertical directions.

A further object of this invention is to provide a mounting system with insulating units for keeping heat losses at a minimum.

Yet a further object of this invention is to provide a mounting system which is simple in construction, easily arranged in various patterns and inexpensive to manufacture.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 2 is a side elevational view, partially in section, of the mounting system illustrated in FIG. 1;

FIG. 3 is an elevational view looking in the direction of line 3—3 of FIG. 2, illustrating additional features of the mounting system;

DESCRIPTION OF THE PREFERRED EMBODIMENT

Figure 1:
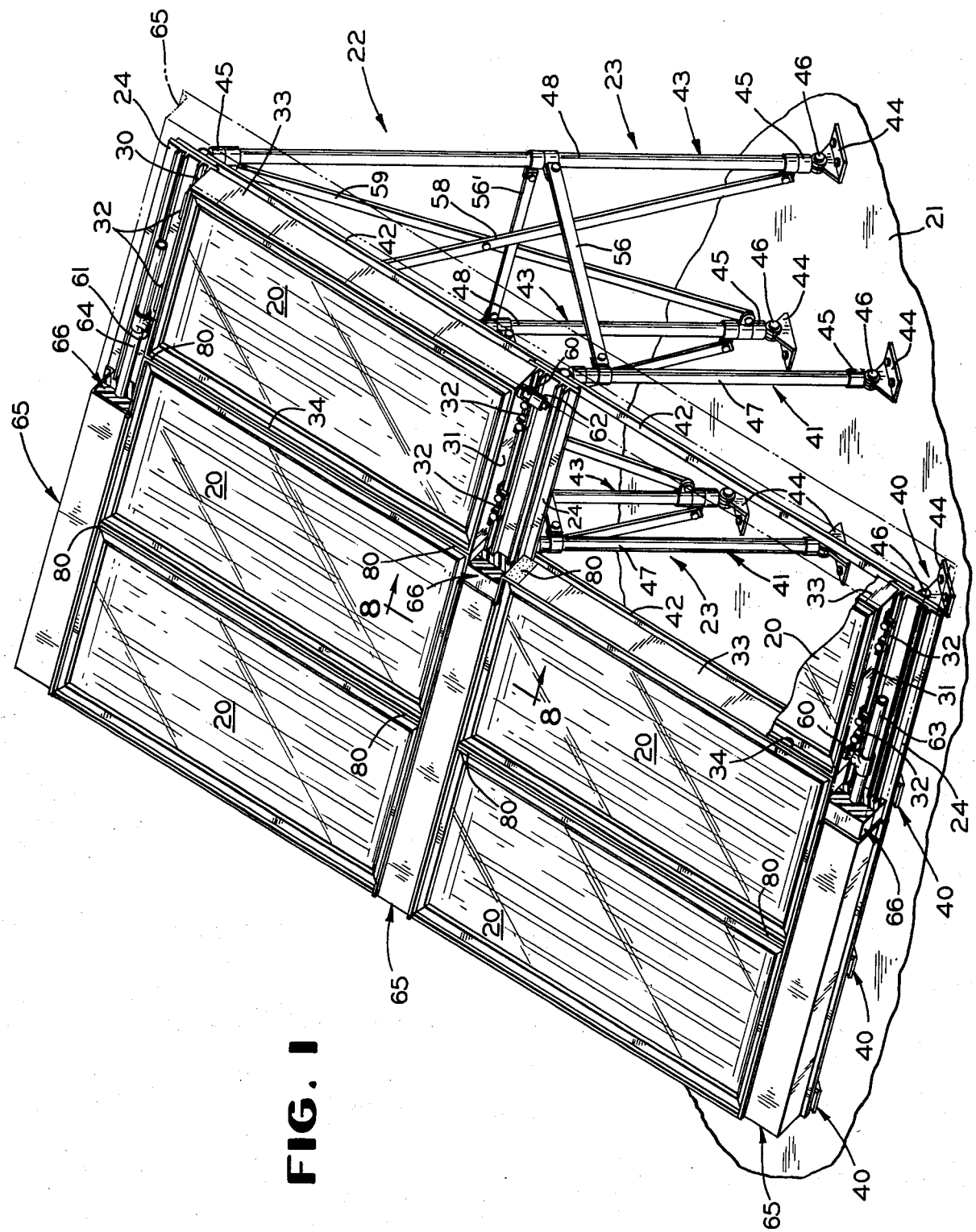
FIG. 1 is a perspective view of a typical flat solar collector installation having portions broken away and illustrating a mounting system constructed in accordance with the invention.

Referring now to FIG. 1, there is illustrated a typical solar collecting installation comprising a plurality of solar collector panels 20 arranged in an array of two horizontal rows, each row including three panels, the rows lying in an inclined plane adjacent to each other. The solar panels 20 are supported at a predetermined angle of inclination from a horizontal supporting surface 21 by a novel mounting system designated in its entirety by the reference numeral 22. The supporting surface 21 may, for example, be the roof of a structure and while illustrated and described as being horizontal, it is contemplated in accordance with the invention that it may also be inclined to the horizontal. The mounting system 22 is composed of a plurality of individual modular sections, each designated by the reference numeral 23, which support a plurality of horizontally extending parallelly spaced mounting spars 24 on which a pair of opposed edges of the solar panels 20 are supported.

In the solar collector array illustrated in FIG. 1, the longitudinal axis of the solar panels 20 extends in the direction of inclination and, accordingly, this array will be designated as a high-profile installation. However, it is to be noted that the longitudinal axis of the solar panels may extend transversely of the direction of inclination; that is, the longitudinal axis of the panels may lie parallel to the mounting spars 24 and, accordingly, this array will be designated as a low-profile installation.

THE SOLAR COLLECTING PANELS

Generally, the solar collector panels 20 per se form no part of the invention and the following description thereof is purely for exemplary purposes. Briefly, each solar collector panel 20 comprises an open, top, rectangularly shaped housing 25 (FIG. 2) having a bottom layer of insulating material 26 (see FIGS. 7, 8 and 9) on which a heat collector plate 26' incorporating tubular heat-absorbing members (not shown) may be supported. The top opening is closed by a pair of glass sheets 27 and 28 separated by a continuous resilient molding 29 which marginally surrounds the glass sheets 27 and 28 and which forms a hermetic seal between the glass sheets and the housing 25.

Figure 4:
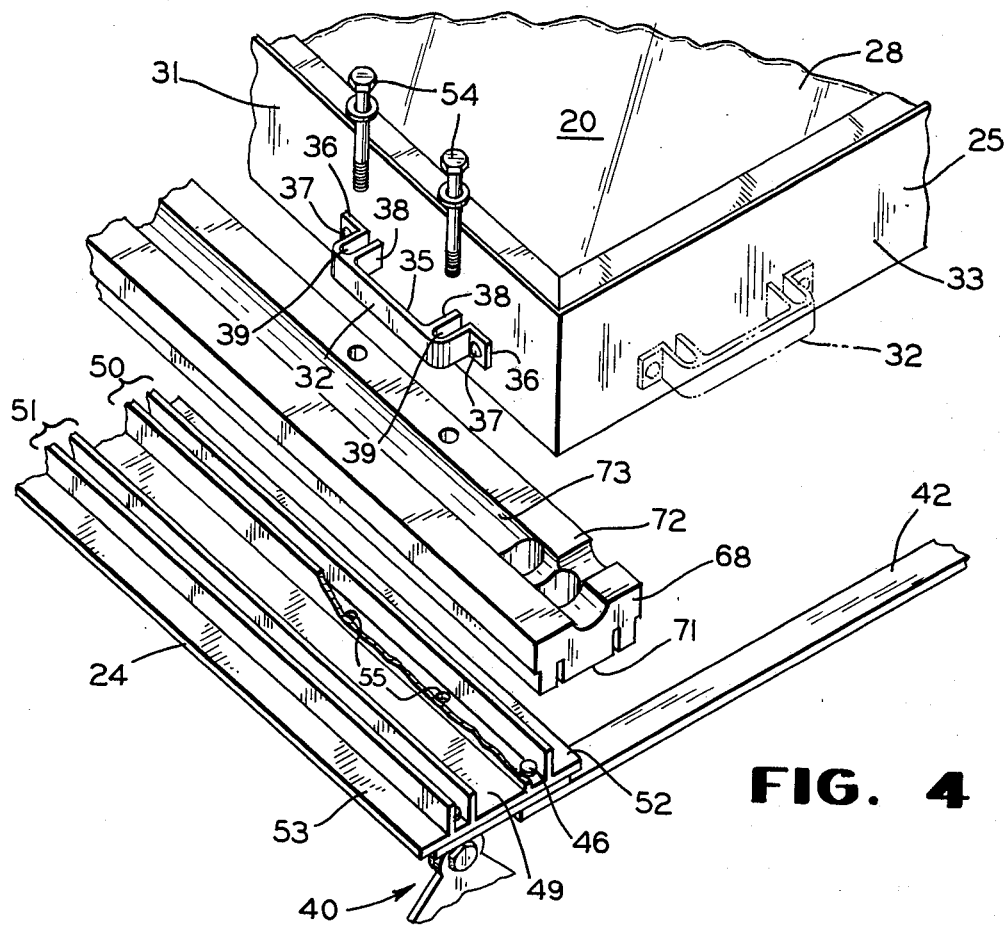
FIG. 4 is an enlarged, fragmentary, exploded perspective view illustrating the expansion and contraction means employed in the mounting system.

According to the invention, and as best shown in FIGS. 1 and 2, each of the opposed end walls 30 and 31 of the collector housing 25 in the high-profile installation illustrated in the drawings is provided with at least one, but preferably a pair, of hold-down brackets which may also serve as handles, each designated by the reference numeral 32 for securing the solar panels 20 to the mounting system 22. In a low-profile installation (not illustrated) the pairs of hold-down brackets 32 would be provided on the opposed side walls 33 and 34 of the collector housing 25 as indicated in dotted lines in FIG. 4. Referring particularly to FIG. 4, each hold-down bracket 32 is formed with a bail portion 35 having a flange 36 extending outwardly from each of its ends for securing, as by rivets 37, the attachment member to collector housing walls. The central area of the bail 35 is provided with a pair of wall members, each designated by the reference numeral 38. Together with the portions of the bail 35, the wall members define a pair of elongated slots 39 which extend parallel to the longitudinal axis of the solar panels 20 for a purpose which will be described in detail hereinafter. Of course, in the low-profile installation, the slots 39 would extend transversely of the solar panels 20.

THE MOUNTING SYSTEM

As previously mentioned, the mounting system 22 is located on the supporting surface 21 to orient the solar collector panels 20 toward the orbit of the sun and in an attitude which maximizes the quantity of solar radiation incident thereon. Accordingly, the mounting system 22 is designed as a separate structure comprised of the modular sections 23 which support the mounting spars 24 in spaced apart positions for receiving opposed edges of the solar panels 20.

At this point, it will be noted that the number of solar panels 20 and their arrangement will have many variations depending upon requirements of the individual solar collecting installation. Thus, the mounting system 22 is designed to support one or more solar panels 20 in one or more rows. Accordingly, the number of modular sections 23 and the number of mounting spars 24 required for a particular installation will depend on the number of solar panels 20 employed therein. In the embodiment of the invention illustrated in FIGS. 1, 2 and 3, the mounting system 22 includes four modular sections 23 and three mounting spars 24.

THE MODULAR SECTIONS

Generally, the modular sections 23 are designed to support at least a pair of mounting spars 24 in a horizontally extending spaced-apart position. As previously noted, the modular sections 23 may be constructed of various structural elements which may take many different forms as long as they include at least a front stand-off member and a rear attitude positioning member, the top ends of which are connected together by a spreader bar for supporting at least a pair of the mounting spars 24.

In the embodiment of the invention illustrated in the drawings, and particularly referring to FIGS. 1 and 2, each modular section 23 has a triangular form and includes a member 40 which is a front stand-off leg. A leg 41 which, in this case, serves as both a rear attitude-positioning leg for the lower row of solar panels and a front stand-off leg for the upper row of solar panels, a rear attitude-positioning leg 43 and two spreader bars 42, one for connecting the top ends of the legs 40 and 41 and the other for connecting legs 41 and 43 together. Each modular section 23 is constructed of standardized hardware items including angle mounting brackets 44, clevis-socket members 45 and fasteners such as bolt assemblies 46.

As best illustrated in FIG. 2, the front leg 40 comprises a pair of angle mounting brackets 44 pivotally connected together by a bolt assembly 46. If desirable, the pair of brackets 44 may be spaced apart by a spacer member (not shown) for providing a desired clearance between the lower edge of the solar panel 20 and the supporting surface 21. The legs 41 and 43 of each section 23 generally comprise upstanding tubular members 47 and 48, respectively, such as lengths of pipe, with one of the clevis-socket members 45 secured to each of their ends, each clevis thereof being fastened to an angle mounting bracket 44 by a bolt assembly 46.

The spreader bars 42 may be flat, elongated metal bars as shown in FIGS. 1 and 2 or standard structural angle members (not shown), the ends of which are provided with elongated apertures or slots 42'(see FIG. 3) which permit limited movement of the spars 24 relative thereto. Of course, the length of the spreader bars 42 is determined by the type of array employed in the solar installation; that is, the length of the bar required in the high-profile array is substantially equal to the length of the solar panels 20 and the length of the bar required in the low-profile array is substantially equal to the width of the solar panels.

THE MOUNTING SPARS

Briefly, the mounting spars 24 generally comprise an elongated member, preferably extruded from aluminum, having a base portion and an abutment portion projecting upwardly from the central area thereof for supporting and holding opposed edges of the solar panels 20. As illustrated in FIGS. 1, 2 and 4, each mounting spar 24 is provided with a base 49 and two pairs of spaced-apart rails 50 and 51 projecting perpendicularly upwardly from the central area thereof. The portions of the base 49 lying outwardly of the outside rail of each pair of rails 50 and 51 serve as support flanges 52 and 53, respectively, on which the opposed edges of the solar collector panels 20 are mounted. The face of the opposed end walls 30 and 31 abut the adjacent face of the outside rail of the pair of rails 50 and 51. Each spar 24 is fastened to the upper one of a pair of the interconnected mounting brackets 44 by the bolt assemblies 46 fastening the spreader bars 42 thereto. This structural arrangement accommodates expansion and contraction of the solar panels 20 relative to the mounting system by permitting the mounting spars to move relative to the spreader bars 42.

Figure 7:
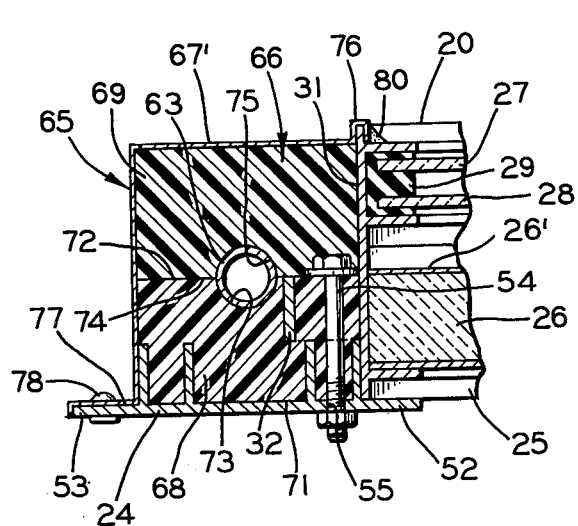
FIG. 7 is a cross sectional view taken substantially along line 7—7 of FIG. 6.
Figure 8:
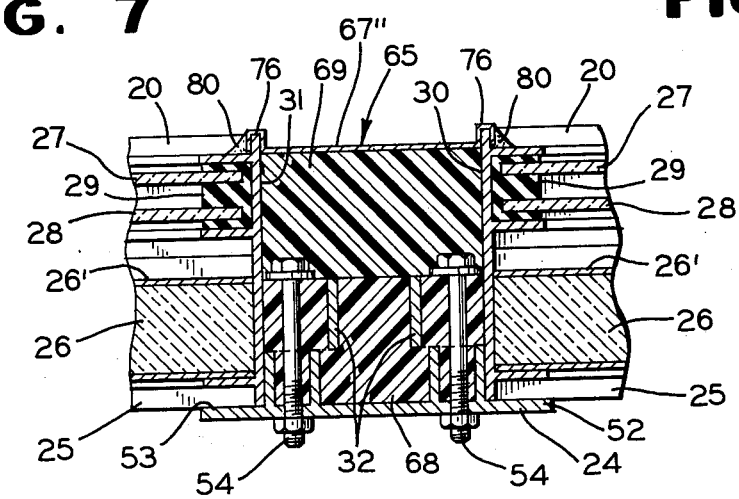
FIG. 8 is a cross sectional view taken substantially along line 8—8 of FIG. 1.

As illustrated in FIGS. 1 and 2 and best shown in FIGS. 7 and 8, each edge of the opposed end walls 30 and 31 of the solar panel housings 25 is supported on the flange portion 52 or 53 of its adjacent spar 24, with the bottom portion of the hold-down bracket 32 extending over the top edges of the rail pairs 50 and 51. Hold-down bolt assemblies 54 extend through the slots 39 and apertures 55 provided between the pairs of rails 50 and 51 for securing the solar panels 20 to the spars 24. Accordingly, the slots 39 permit easy alignment of bolts 54 with the apertures 55 in the mounting spars 24.

In the case where the solar collecting array includes two rows of panels 20 as illustrated in FIGS. 1, 2 and 3, it is desirable to provide the mounting system 22 with bracing members to withstand wind loads. Accordingly, a brace member 56 extending horizontally between the leg 41 and the leg 43 is provided to strengthen each modular section 23. The brace 56 is attached to the legs 41 and 43 by means of clevis-collars 57 mounted on the tubular members 47 and 48 of each leg, wherein the clevis portion is attached to the ends of the brace 56 by a bolt assembly 46. Also, pairs of diagonal cross-braces 58 and 59 are attached to and extend between the legs 43 as well as horizontally extending brace member 56' of each modular section 23 for strengthening the mounting system 22. Like the brace 56, the ends of the diagonal braces 58 and 59 are attached to the legs 43 by clevis-collars 57 mounted on the tubular members 48 and bolt assemblies 46 which fasten the ends of the brace members 58 and 59 thereto.

THE MANIFOLD PIPING INSULATING SYSTEM

As contemplated by the invention, the mounting system 22 also includes means for insulating and supporting the fluid circulating piping interconnecting the individual adjacent solar panels 20 forming the series type solar collector array illustrated in the drawings.

Interconnection of the adjacent solar panels 20 for circulation of heat exchange fluid is illustrated in FIG. 1. As there shown, each solar panel is provided with an inlet tube 60 and an outlet tube 61 with the outlet tubes 61 of the lower row of panels 20 being connected to the adjacent inlet tubes 60 of the upper row of panels 20 by an expansion connector 62. Each inlet tube 60 of the lower row of panels 20 is connected to a supply manifold pipe 63 and each outlet tube 61 of the upper row of panels 20 is connected to a return manifold pipe 64. The manifold pipes 63 and 64 interconnecting the solar panels are installed in the mounting system 22 to extend along and over their adjacent mounting spar 24, the purpose of which will be described in detail hereinafter.

Figure 9:
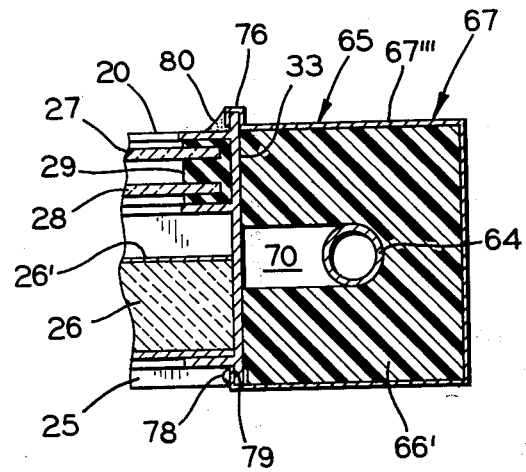
FIG. 9 is a cross sectional view taken substantially along line 9—9 of FIG. 6.

In accordance with the invention, the manifold pipes 63 and 64 and the expansion connectors 62 are encased in manifold covers generally designated by the reference numeral 65. Also, it is to be noted that the manifold covers 65 insulate the side walls of the solar panels as well as the piping system. Generally, the manifold covers 65 comprise elongated insulating blocks 66 adaptable to be housed within flashings 67 having various configurations so as to contain and attach the insulating blocks 66 to the mounting system and/or the solar panels. Preferably, the insulating blocks 66 are molded from a foam insulating material, but they also may be fabricated from insulating foam building panels or cut from insulating foam bar stock material. Preferably, the insulating blocks 66 are pre-shaped and comprise two sections; that is, bottom sections 68 having various forms and top sections 69 having complementary forms. However, as illustrated in FIG. 9, an insulating block 66' may also be formed as an integral unit provided with a cut-out portion 70 for receiving the straight portion of the manifold pipe 64.

Figure 5:
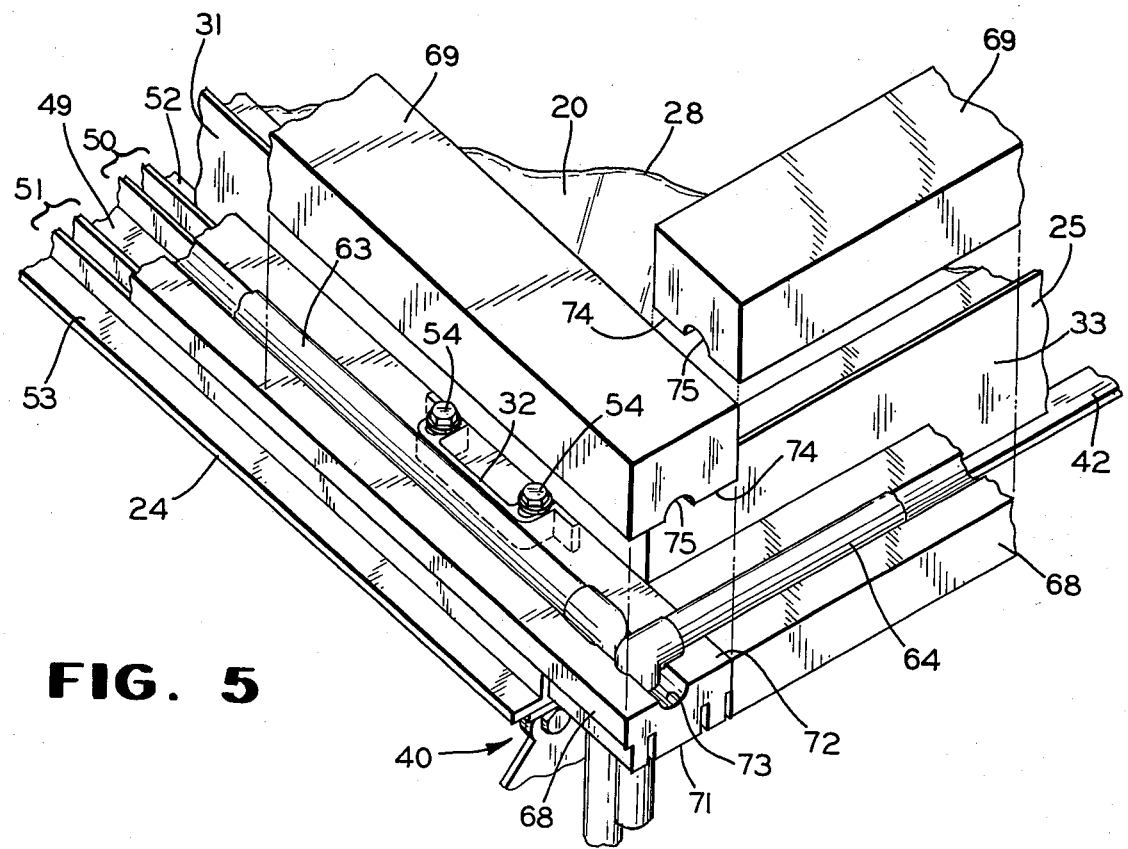
FIG. 5 is a view similar to FIG. 4 but showing the manifold pipes and the insulation thereof.

As previously mentioned, the manifold piping 63 and 64 is installed to overlie the mounting spars 24. Accordingly, and as clearly illustrated in FIGS. 4 and 7, the lower surface 71 of the bottom section 68 of the insulating block is configured to receive the pair of rails 50 and 51 of the mounting spars 24 and the upper surface 72 of the bottom sections 68 may be provided with either longitudinally extending grooves 73 to receive the lower portions of the manifold pipes 63 and 64 or transverse grooves (not shown) to receive the expansion connectors 62 as the case may be. Accordingly, each manifold pipe 63 and 64 overlying the mounting spars 24 is supported thereby on the bottom section 68 of its respective insulating block 66. Referring now to FIG. 5, the lower surface 74 of the top section 69 of the insulating block may be provided with a longitudinally extending groove 75 to receive the upper portions of the manifold pipes 63 and 64. However, since the insulating block 66 is formed of foam material, the manifold pipes may be depressed therein without providing such grooves.

Figure 6:
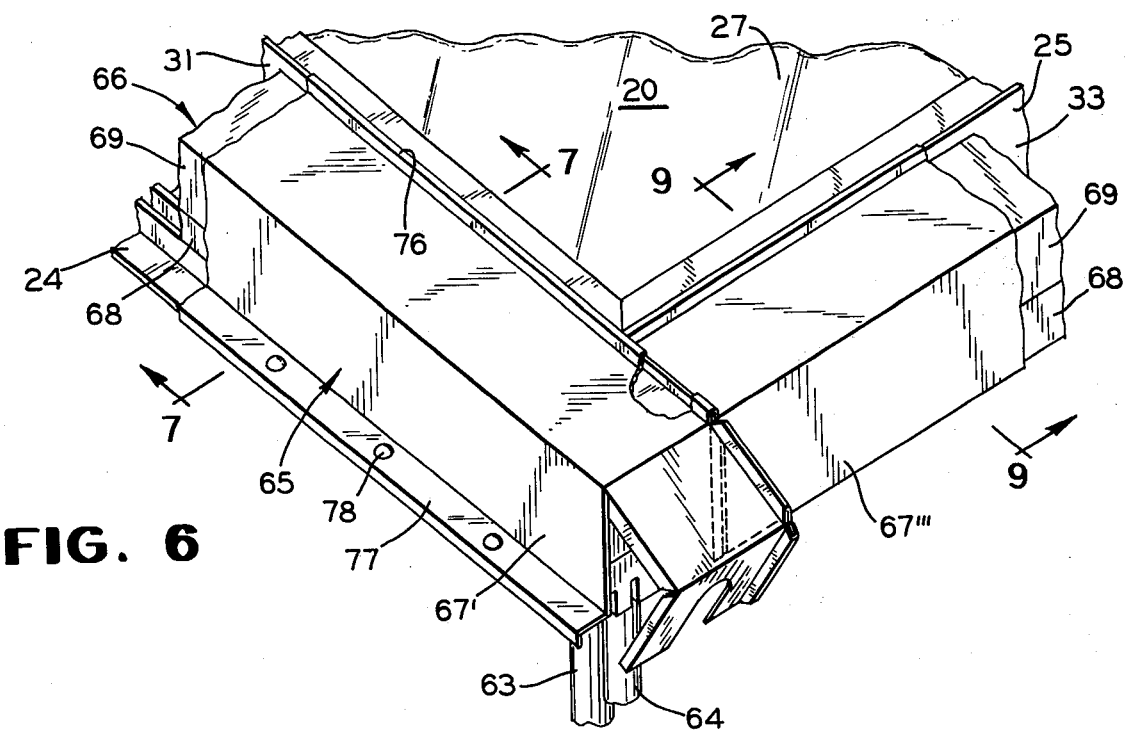
FIG. 6 is an enlarged fragmentary perspective view illustrating the attachment of the insulating blocks and the flashing to the mounting system.

Referring now to FIG. 7, the flashing configuration 67' covering the insulating block 66 supported on the outer positioned mounting spars 24 is angle-shaped to cover the top and the outer side of the insulating block 66 for protecting them from the elements. More particularly, the top edge of the flashing 67', as clearly illustrated in FIGS. 6 and 7, is formed with a U-shaped flange 76 for providing a snap-fit connection with the upper rim of the solar housing 25. The bottom edge of the flashing 67' is provided with a flange 77 which is attached to the mounting spar 24 by fasteners such as by rivets or bolts 78.

When two horizontal rows of solar panels 20 are employed in a solar array as illustrated in FIG. 1, the insulating block 66 provided on the intermediate mounting spar 24 is covered by a flashing configuration 67" having a planar form. The ends of this configuration are provided with U-shaped flanges, such as the flanges 76, for providing a snap-fit connection to attach the flashing 67" to the top rim of each of the adjacent solar housings 25 as illustrated in FIG. 8.

Referring now to FIG. 9, the flashing configuration 67''' is U-shaped in cross section for attachment of the insulating block 66 to the rim of the solar housing 25 when the return pipe 64 extends along the side edge (indicated by dashed lines in FIG. 1) of the solar collecting array. In this embodiment, the top edge of the flashing 67''' is provided with a U-shaped flange, such as the flange 76, for a snap-fit connection to the top rim of the adjacent wall of the solar collector housing 25. The bottom edge of the flashing 67''' is provided with an upstanding flange 79 for attachment to the bottom of the solar housing 25 as by rivets 78.

Referring now to FIGS. 7, 8 and 9, a bead of sealant material 80 is provided around the upper rim of the solar panels 20 for sealing the snap fit connections of the flashings 67 thereto thereby preventing water from seeping into the manifold piping and insulating area of the solar array.

As illustrated in FIG. 1, portions of the abutting side walls on the adjacent solar panels 20 of each row of the panels adjacent the mounting spars 24 also are provided with the sealant material 80 to prevent water seepage into the manifold piping and insulating areas.

It is to be understood that the forms of the invention herewith shown and described are to be taken as illustrative embodiments only of the same, and that various changes in the shape, size and arrangement of the parts may be resorted to without departing from the spirit of the invention.

We claim:

1. In combination with a solar collector panel, a mounting apparatus for supporting the solar collector panel in a predetermined position comprising:
   a. at least two modular sections constructed of standardized components;
   b. a pair of mounting spars attached to said modular sections in parallel, spaced-apart relationship for supporting opposed edges of said solar panel, each said mounting spar comprising an elongated base, and upstanding rails;
   c. hold-down brackets affixed to said opposed edges of said solar panel and extending over said rails for securing said solar panel to said mounting spars;
   d. means fastening said hold-down brackets on said solar panel to said mounting spars;
   e. manifold pipes connected to the solar collector panel for passing a fluid heat exchange medium through said solar collector; and
   f. means for covering and insulating said manifold pipes, said covering and insulating means comprising an elongated insulating block and a flashing for covering and attaching said insulating block to said solar panel and said mounting spars, said insulating block comprising top and bottom sections, the bottom section being configured to receive said rails provided on said mounting spars.

2. In combination with a solar collector panel, a mounting system for supporting the solar collector panel in a predetermined position comprising:
   a. at least two mounting spars disposed in a spaced-apart horizontally extending parallel relationship for supporting opposed edges of said solar panel, each said mounting spar comprising an elongated member having a base portion and an abutting portion projecting upwardly from the central area of said base portion and defining a support for one of said opposed edges of said solar panel;
   b. means for supporting said mounting spars in said spaced-apart parallel relationship and said solar panel in the predetermined position;
   c. at least one hold-down means attached to each said opposed edge of said solar panel and disposed in a position to extend over said abutting position of said mounting spars; and
   d. means for securing said hold-down means to said mounting spars whereby said solar panel is supported and held in abutting relationship on said mounting spars, said abutting portion of said mounting spars comprising a pair of parallel rails extending along the length of the base and said hold-down means comprising brackets disposed on the top edges of said rails and said hold-down brackets include elongated slots which register with apertures provided between the rails on said mounting spar and said securing means comprises bolts extending through said slots and said apertures whereby each opposed end of said solar panel is respectively fastened to a said mounting spar in a supporting and abutting relationship.

* * * * *

UNITED STATES PATENT AND TRADEMARK OFFICE
CERTIFICATE OF CORRECTION

PATENT NO. : 4,269,173
DATED : May 26, 1981
INVENTOR(S) : Wallace F. Krueger et al It is certified that error appears in the above-identified patent and that said Letters Patent are hereby corrected as shown below:

Col. 1, line 26, after "clude" insert --a--
Col. 5, line 64, after "as" (second occurrence) insert --a--
Col. 8, line 38, "position" (second occurrence) should be --portion--

Signed and Sealed this

Twenty-ninth Day of September 1981

[SEAL]

Attest:

Attesting Officer

GERALD J. MOSSINGHOFF

Commissioner of Patents and Trademarks